(12) United States Patent
Nagatoshi et al.

(10) Patent No.: US 10,338,491 B2
(45) Date of Patent: Jul. 2, 2019

(54) OPTICAL SCANNING APPARATUS AND OPTICAL SCANNING APPARATUS SYSTEM

(71) Applicant: CANON KABUSHIKI KAISHA, Tokyo (JP)

(72) Inventors: Jun Nagatoshi, Tokyo (JP); Hiroyuki Fukuhara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 15/043,366

(22) Filed: Feb. 12, 2016

(65) Prior Publication Data

US 2016/0241734 A1 Aug. 18, 2016

(30) Foreign Application Priority Data

Feb. 17, 2015 (JP) ................... 2015-028947

(51) Int. Cl.
*G02B 26/08* (2006.01)
*G03G 15/043* (2006.01)
*G02B 26/10* (2006.01)
*F21V 23/06* (2006.01)
*F21V 19/04* (2006.01)
*G03G 15/04* (2006.01)

(52) U.S. Cl.
CPC ......... *G03G 15/043* (2013.01); *F21V 19/045* (2013.01); *F21V 23/06* (2013.01); *G02B 26/10* (2013.01); *G03G 15/04036* (2013.01)

(58) Field of Classification Search
CPC ....... F21V 23/06; F21V 19/045; G02B 26/10;
G02B 26/0841; G02B 26/105; G02B 27/0955; G02B 27/0966; G03G 15/04036; G03G 15/04; H04N 1/113; H04N 1/1135
USPC ........... 359/196.1–226.2; 362/611, 612, 617, 362/619, 631
See application file for complete search history.

(56) References Cited

U.S. PATENT DOCUMENTS

| | | | | |
|---|---|---|---|---|
| 7,535,610 | B2 * | 5/2009 | Kitaoka | ................ G02B 7/004 359/196.1 |
| 2009/0003883 | A1 | 1/2009 | Choi | |
| 2012/0293849 | A1 * | 11/2012 | Nakajima | ............ G02B 26/123 359/204.1 |

FOREIGN PATENT DOCUMENTS

| | | |
|---|---|---|
| JP | 2002-344060 A | 11/2002 |
| JP | 2005305950 A | 11/2005 |
| JP | 2006072136 A | 3/2006 |
| JP | 2006-164476 A | 6/2006 |
| JP | 2010087032 A | 4/2010 |
| JP | 4463906 B2 | 5/2010 |

\* cited by examiner

*Primary Examiner* — Euncha P Cherry
(74) *Attorney, Agent, or Firm* — Canon U.S.A., Inc. IP Division

(57) ABSTRACT

An optical scanning apparatus according to the present invention includes a light source, and a substrate including an electric circuit for causing the light source to emit light. The number of holes in the substrate into which terminals in the light source are respectively inserted is larger than the number of the terminals, so that the substrate can also be used for another light source including a different number of terminals.

10 Claims, 7 Drawing Sheets

ENLARGED VIEW OF PORTION A

ENLARGED VIEW OF PORTION B

ENLARGED VIEW OF PORTION A

ENLARGED VIEW OF PORTION B

ENLARGED VIEW OF PORTION A

ENLARGED VIEW OF PORTION B

OPTICAL SCANNING APPARATUS AND OPTICAL SCANNING APPARATUS SYSTEM

BACKGROUND OF THE INVENTION

Field of the Invention

The present invention relates to an optical scanning apparatus that scans by light a surface to be scanned.

Description of the Related Art

A conventional optical scanning apparatus used for an image forming apparatus such as a laser printer optically modulates a laser beam emitted from a light source in response to an image signal and performs a deflection scanning by the optically modulated laser beam using a light deflector. As a light source that emits the laser beam, different semiconductor lasers (e.g. a single-beam semiconductor laser that has one light emitting point and a multibeam semiconductor laser that has a plurality of light emitting points) are used depending on a printing speed and an image quality of the image forming apparatus.

Japanese Patent Application Laid-Open No. 2005-305950 discusses a configuration in which, when a multibeam semiconductor laser is used, an arrangement angle of light emitting points of the semiconductor laser is set by rotating and fixing the semiconductor laser around an optical axis so that a distance in a sub scanning direction between a plurality of light beams becomes a predetermined value.

Meanwhile, in recent years, manufacturers each have printer products lineups including various types of printers so that a user can select a printer depending on the use. There is a case where there is a plurality of types of printer products that have substantially the same outer shapes but differ in printing speed and image quality. In such a case, it is useful even in controlling costs to share components and units among the plurality of types of printer products. More specifically, a printer product that has a low printing speed may be loaded with a first optical scanning apparatus using a single-beam semiconductor laser, and a printer product that has a high printing speed may be loaded with a second optical scanning apparatus using a multibeam semiconductor laser. In this case, sharing of components and units, which covers a wide range of printer products, can be performed by partially changing components between the first optical scanning apparatus and the second optical scanning apparatus. In this case, to differently manufacture the first optical scanning apparatus and the second optical scanning apparatus, it is necessary not only to use different semiconductor lasers (i.e. a single-beam semiconductor laser and a multibeam semiconductor laser) but also to use different substrates that include a driving circuit for driving the semiconductor laser.

If different substrates are used depending on the number of light emitting points in the light source, however, a plurality of types of substrates need to be respectively produced. This requires costs for a production facility and management.

SUMMARY OF THE INVENTION

The present invention is directed to an optical scanning apparatus and an optical scanning apparatus system which are capable of suppressing an increase in production cost by the use of a common substrate for light sources respectively having different numbers of light emitting points.

According to an aspect of the present invention, an optical scanning apparatus includes a light source, and a substrate including an electric circuit for causing the light source to emit light, wherein the light source and the electric circuit are connected to each other with terminals of the light source inserted into holes provided at positions, opposing the light source, of the substrate, and wherein the substrate includes a plurality of holes, and a number of the plurality of holes is larger than a number of the terminals of the light source.

According to another aspect of the present invention, an optical scanning apparatus system includes a first optical scanning apparatus that includes a first light source, and a first substrate including a first electric circuit for causing the first light source to emit light, the first light source and the first electric circuit being connected to each other with first terminals of the first light source inserted into a plurality of first holes provided at positions, opposing the first light source, of the first substrate, and a second optical scanning apparatus that includes a second light source, and a second substrate including a second electric circuit for causing the second light source to emit light, the second light source and the second electric circuit being connected to each other with second terminals of the second light source inserted into a plurality of second holes provided at positions, opposing the second light source, of the second substrate, wherein a number of the plurality of first holes provided in the first substrate and a number of the plurality of second holes provided in the second substrate are the same, a number of the first terminals of the first light source is smaller than the number of the plurality of first holes, and a number of the second terminals of the second light source and the number of the plurality of second holes are the same.

Further features of the present invention will become apparent from the following description of exemplary embodiments with reference to the attached drawings.

DESCRIPTION OF THE EMBODIMENTS

An exemplary embodiment of the present invention will be described. Unless respective sizes, materials, and shapes of components described in the exemplary embodiment described below, and their relative arrangement are specifically described, the scope of the present invention is not intended to be limited to only them.

[Image Forming Apparatus]

Figure 1:
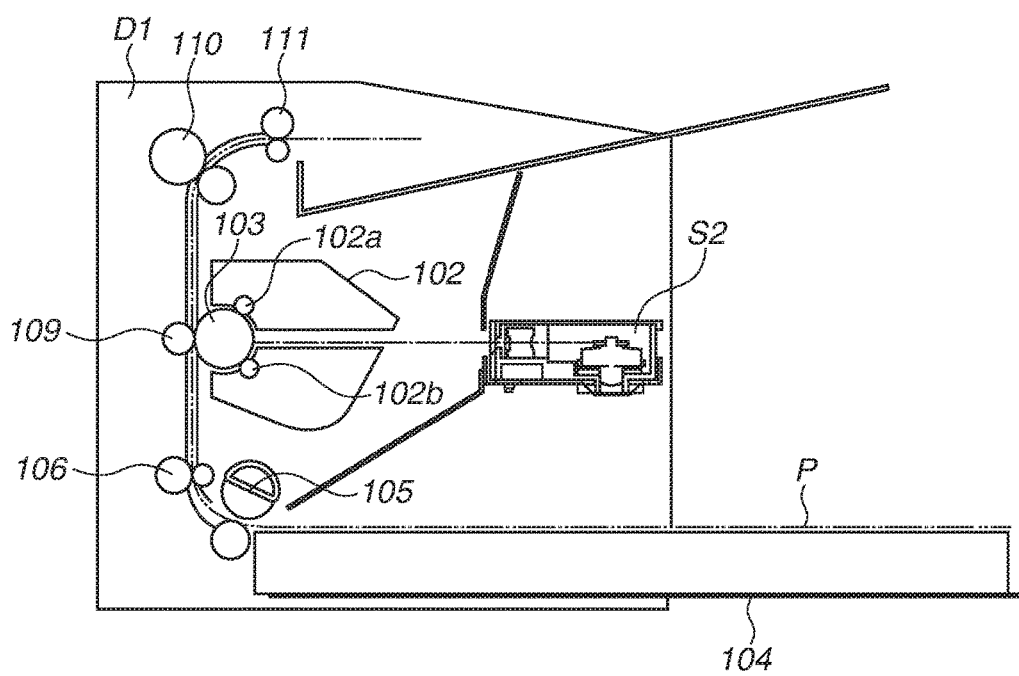
FIG. 1 is a schematic sectional view illustrating an image forming apparatus.

FIG. 1 is a schematic sectional view of an image forming apparatus D1 according to the present exemplary embodiment. The image forming apparatus D1 according to the present exemplary embodiment includes an optical scanning apparatus S2, and forms an image on a recording material such as recording paper based on received image information. As illustrated in FIG. 1, the image forming apparatus D1 emits a laser beam based on received image information, via the optical scanning apparatus S2 serving as an exposure unit and irradiates a photosensitive drum 103 included in a process cartridge 102 with the emitted laser beam. When the photosensitive drum 103 whose surface has been charged by a charging unit 102a is irradiated with the light beam, and is exposed, a latent image is formed on the photosensitive drum 103. A development unit 102b develops the latent image as a toner image. The process cartridge 102 integrally includes the photosensitive drum 103, and the charging unit 102a and the development unit 102b serving as process units acting on the photosensitive drum 103. Meanwhile, recording materials P stacked on a recording material stacking plate 104 are fed while being separated one by one by a feed roller 105. Each of the recording materials P is then further conveyed toward a downstream side by a conveyance roller 106. A toner image, which has been formed on the photosensitive drum 103, is transferred onto the conveyed recording material P by a transfer roller 109. The recording material P on which the unfixed toner image has been formed is further conveyed toward the downstream side. The unfixed toner image on the recording material P is fixed onto the recording material P by a fixing device 110 having a heating member therein. Then, the recording material P is discharged out of the apparatus by a discharge roller 111.

In the present exemplary embodiment, the process cartridge 102 includes the charging unit 102a and the development unit 102b serving as the process units acting on the photosensitive drum 103 integrally with the photosensitive drum 103. However, each of the process units may be separated from the photosensitive drum 103.

[Optical Scanning Apparatus S2]

Figure 2:
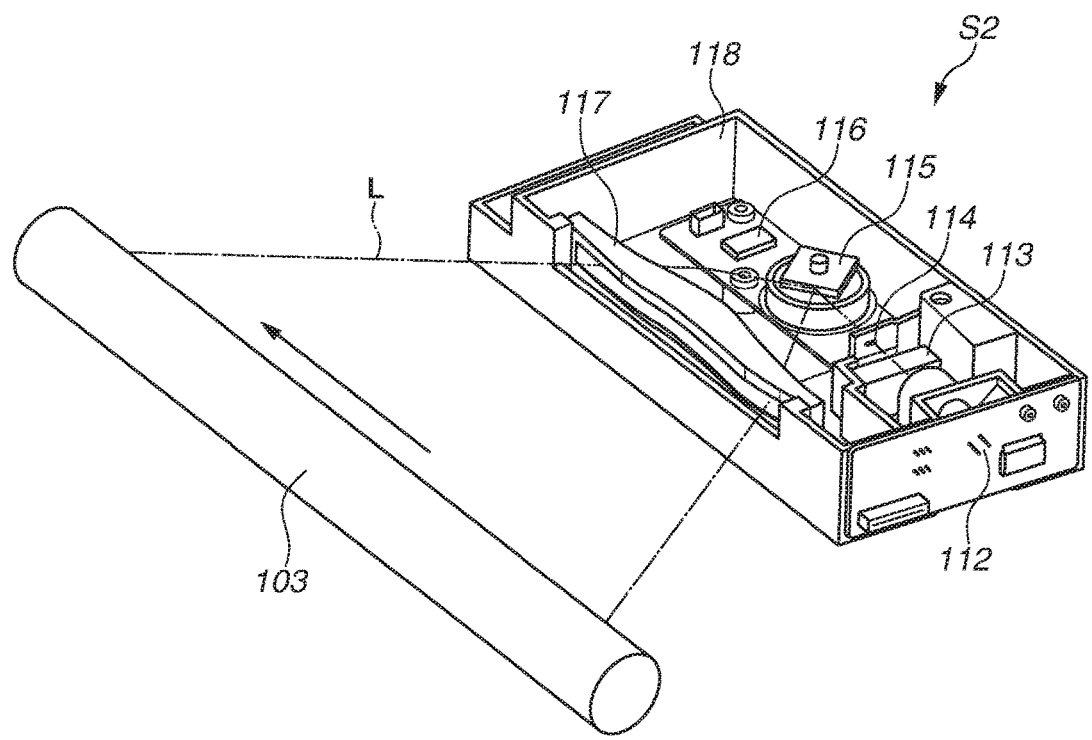
FIG. 2 is a perspective view illustrating a configuration of an optical scanning apparatus.
Figure 3:
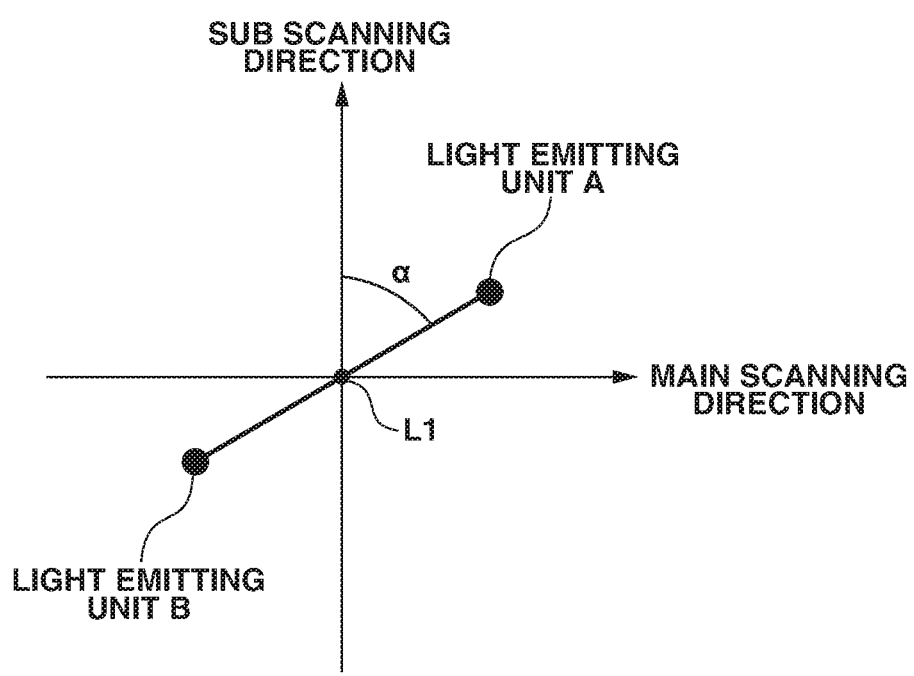
FIG. 3 is a schematic view illustrating an arrangement of a light emitting unit in a multibeam light source.

A configuration of the optical scanning apparatus S2 will be described below with reference to FIGS. 2 to 4. FIG. 2 is a perspective view illustrating the configuration of the optical scanning apparatus S2 according to the present exemplary embodiment. For the purpose of illustration, a cover serving as a sealing member is not illustrated in FIG. 2.

A semiconductor laser (light source) 112 emits two laser beams that are independently controllable. In FIG. 2, the two laser beams emitted from the semiconductor laser (light source) 112 pass through a compound anamorphic collimator lens 113 obtained by integrally molding a collimator lens and a cylindrical lens, and an aperture diaphragm 114. The two laser beams enter a reflection surface of a rotating polygon mirror 115 that serves as a deflection and scanning unit configured to deflect and scan the laser beams (herein, an expression "scan a light beam" is used to mean performing a scanning by a light beam). The rotating polygon mirror 115 is driven to rotate by a motor arranged under the rotating polygon mirror 115. The motor is loaded onto a motor driving circuit substrate 116. The two laser beams, which have been reflected and then deflected and scanned by the rotating polygon mirror 115, pass through an fθ lens (scanning lens) 117. The semiconductor laser 112, the compound anamorphic collimator lens 113, the aperture diaphragm 114, the rotating polygon mirror 115, the motor, and the fθ lens 117 are supported by an optical box 118.

In the above-described configuration, the two light beams L, which have been emitted from the light source 112, are formed into substantially converged lights within a main scanning cross section and are formed into converged lights within a sub-scanning cross section by the compound anamorphic collimator lens 113. Then, the two laser beams L pass through the aperture diaphragm 114 to have their light beam widths restricted, and are thereby formed as substantial line images (line images that are long in the main scanning direction) on the reflection surface of the rotating polygon mirror 115. The two laser beams L are deflected and scanned by rotating the rotating polygon mirror 115. The two laser beams L are reflected by the reflection surface of the rotating polygon mirror 115, and are entered in a beam detecting (BD) sensor (not illustrated). At this time, the BD sensor detects a signal, and this timing in which the BD sensor detects the signal is set to a synchronization detection timing of a writing position in the main scanning direction. The laser beams L then enter the fθ lens 117. The fθ lens 117 collects the two laser beams L to respectively form spots on the photosensitive drum 103 while keeping the scanning speeds of the spots uniform. To obtain such a characteristic of the fθ lens 117, the fθ lens 117 is formed of an aspheric lens. The laser beams L, which have passed through the fθ lens 117, are focused and scanned on the photosensitive drum 103.

The two laser beams L are deflected and scanned by the rotation of the rotating polygon mirror 115. In this way, each of the spots of the two laser beams L on the photosensitive drum 103 moves in the main scanning direction which is a direction parallel to a rotational axis of the photosensitive drum 103. Thus, the spots of the two laser beams L draw two scanning lines parallel to the main scanning direction and at different positions in a sub scanning direction, thereby performing a main scanning by the two laser beams L. When the photosensitive drum 103 is driven to rotate, a surface of the photosensitive drum 103 moves relatively with respect to the spots in the sub scanning direction perpendicular to the main scanning direction, and thereby a sub-scanning is performed. In this way, an electrostatic latent image is formed on the surface of the photosensitive drum 103.

[Assembly of Optical Scanning Apparatus S2]

Figure 4:
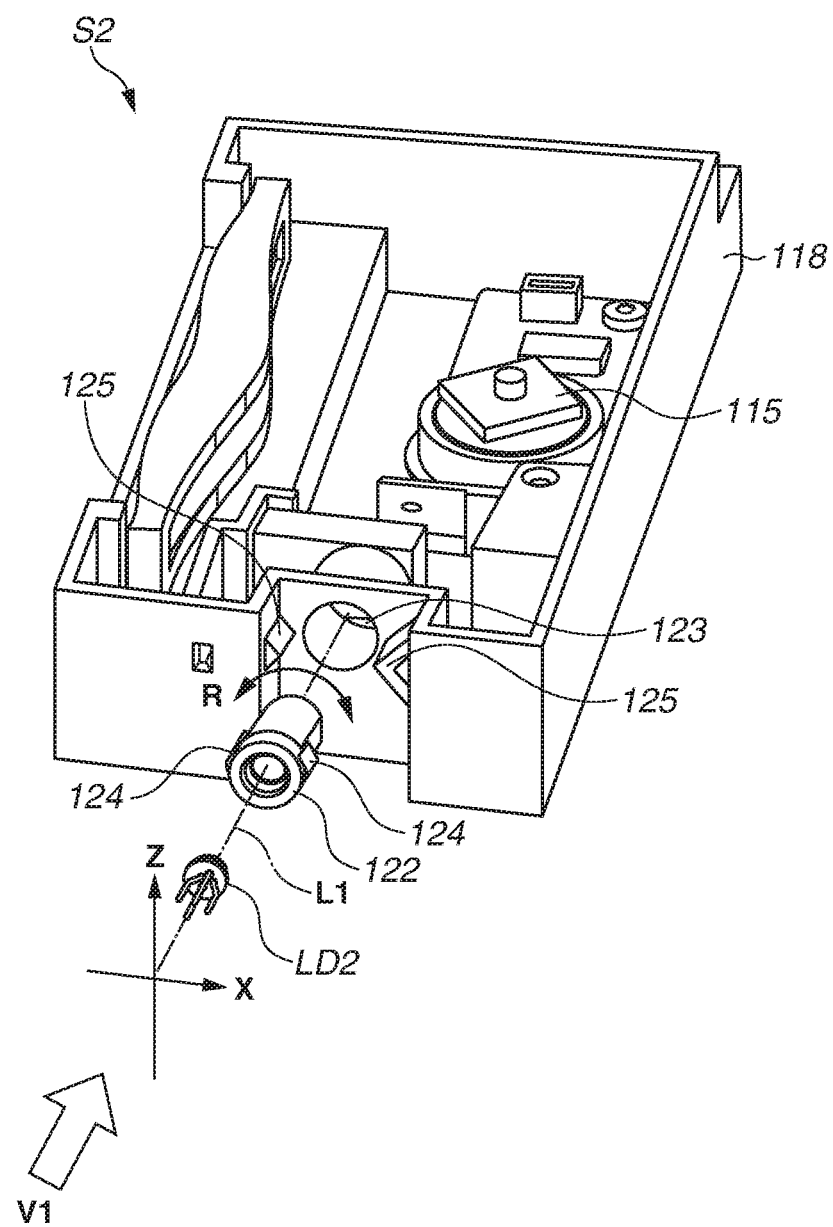
FIG. 4 is a perspective view illustrating rotation adjustment of a light source unit of the optical scanning apparatus.

FIG. 4 is a perspective view illustrating a configuration of the light source unit (light source) of the optical scanning apparatus S2 in more detail. In the optical scanning apparatus S2, a light source LD2, which emits two beams that are independently controllable, is used as the semiconductor laser 112. An optical axis L1 is an optical axis in a design of the light source LD2, and a direction in which the two beams are emitted is parallel to the optical axis L1. An X-direction is a direction corresponding to a main scanning direction at a position of the light source LD2, and is perpendicular to the optical axis L1 and the rotational axis of the rotating polygon mirror 115. A Z-direction is a direction corresponding to the sub scanning direction at the position of the light source LD2, and is parallel to the rotational axis of the rotating polygon mirror 115 and perpendicular to the optical axis L1. Directions indicated by an arrow R is rotational directions around the optical axis L1. The light source LD2 is previously pressed into a laser holder 122 serving as a light source holding unit with a rotation phase around the optical axis L1 determined to some extent. The laser holder 122 is inserted into a hole 123 provided in an optical box 118. The laser holder 122 is rotated in the directions indicated by the arrow R, to adjust a distance between two light emitting units of the light source LD2 in the Z-direction that is the direction corresponding to the sub scanning direction.

The adjustment of the distance in the Z-direction will be described. FIG. 3 is a schematic view illustrating an arrangement of the light emitting units (light emitting points) A and B in the light source LD2. In a two-beam light source such as the light source LD2, two light emitting units (light emitting points) A and B whose respective light emissions are independently controllable are arranged with a predetermined distance apart from each other on an end surface of a semiconductor laser chip. When the light emitting units A and B are arranged side by side along the sub scanning direction, a distance among a plurality of scanning lines in the sub scanning direction on the surface of the photosensitive drum 103 becomes significantly larger than a recording density. Therefore, the rotation phase around the optical axis L1 of the light source LD2 is usually set so that a straight line connecting the light emitting units A and B forms a predetermined angle α, the degree of which is not zero, with respect to a direction corresponding to the sub scanning direction, as illustrated in FIG. 3. When the angle of inclination α is adjusted, the distance among the plurality of scanning lines in the sub scanning direction (a so-called sub scanning pitch) on the surface of the photosensitive drum 103 is accurately adjusted to match a desired recording density. More specifically, the light emitting units A and B are respectively arranged at different positions in the direction corresponding to the main scanning direction and the direction corresponding to the sub scanning direction. When a single-beam light source having only one light emitting unit (light emitting point) on an end surface of a semiconductor laser chip is used, only one scanning line can be simultaneously formed on the surface of the photosensitive drum 103. Thus, the above described angle adjustment need not be performed.

In the light source unit illustrated in FIG. 4, the laser holder 122 is rotated in the R-directions to adjust the distance between the two light emitting units as described above. At the same time, the laser holder 122 is adjusted in the X-direction and the Z-direction to also adjust an irradiation position on the photosensitive drum 103. The laser holder 122 has protruding portions 124 that protrude in directions perpendicular to the optical axis L1, and the optical box 118 has fixing portions 125 that protrude in directions toward the laser holder 122. In a state in which the distance in the sub scanning direction between the light emitting units A and B is adjusted, an adhesive (not illustrated) is applied between the protruding portions 124 and the fixing portions 125 close thereto, to fix the laser holder 122 to the optical box 118.

Figure 6A:
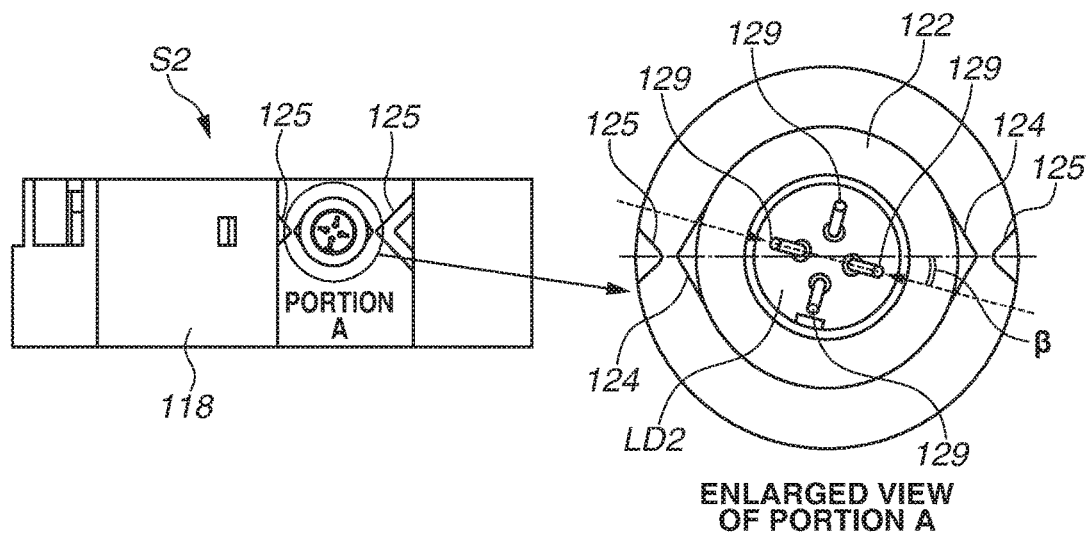
FIGS. 6A and 6B are respectively front views of a laser driving unit including a two-beam light source.
Figure 6B:
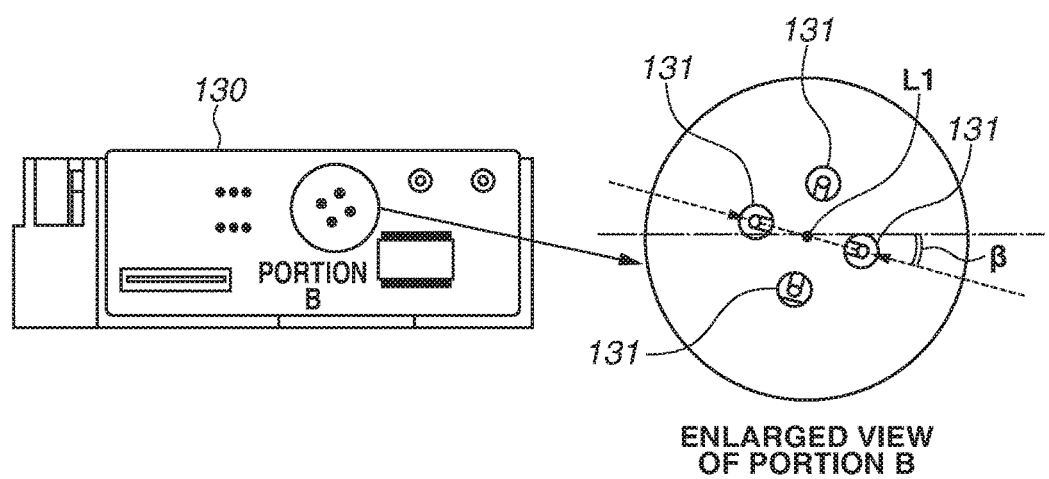

FIGS. 6A and 6B illustrate the optical scanning apparatus S2 using the two-beam light source as viewed from the side of a laser driving circuit substrate 130. FIG. 6A illustrates the optical box 118, on which the laser driving circuit substrate 130 has not yet been mounted, as viewed from V1 in FIG. 4. FIG. 6B illustrates the optical box 118, on which the laser driving circuit substrate 130 has been mounted, as viewed from V1. The vicinity of the light source LD2 enclosed by a circle on the left side of FIG. 6A is a portion A, and an enlarged view of the portion A is illustrated on the right side thereof. Similarly, the vicinity of the light source LD2 enclosed by a circle on the left side of FIG. 6B is a portion B, and an enlarged view of the portion B is illustrated on the right side thereof. As illustrated in FIG. 6A, the number of lead pins (terminals) 129 in the light source LD2 is four. As described above, in the light source LD2, the distance between the two light emitting units A and B is adjusted to a predetermined value. Thus, a straight line connecting the opposing lead pins 129 is inclined at about an angle of β with respect to a plane corresponding to the main scanning direction. The light source LD2 includes a laser diode chip, and the laser diode chip has an end surface having a light emitting point and a chip surface perpendicular to the end surface. If the straight line connecting the opposing lead pins 129 is inclined at the angle of β with respect to the plane corresponding to the main scanning direction as described above, the chip surface is also inclined at the angle of β with respect to the plane corresponding to the main scanning direction.

Therefore, a straight line connecting opposing holes 131 provided in the laser driving circuit substrate 130 is inclined at about the angle of β with respect to the plane corresponding to the main scanning direction, as illustrated in FIG. 6B. The holes 131 are arranged at equal spaces on a concentric circle centered at the optical axis L1 of the light source LD2.

After the laser holder 122 has been fixed to the optical box 118, the laser driving circuit substrate 130 is mounted on the optical box 118 so that the four lead pins 129 respectively penetrate the four holes 131 provided in the laser driving circuit substrate 130, as illustrated in FIG. 6B. Each of the holes 131 and the corresponding lead pin 129 are soldered to each other. A laser driving circuit serving as an electric circuit for causing the light source LD2 to emit light, provided in the laser driving circuit substrate 130, and the light source LD2 are electrically connected to each other.

[Conventional Optical Scanning Apparatus S1]

Figure 5A:
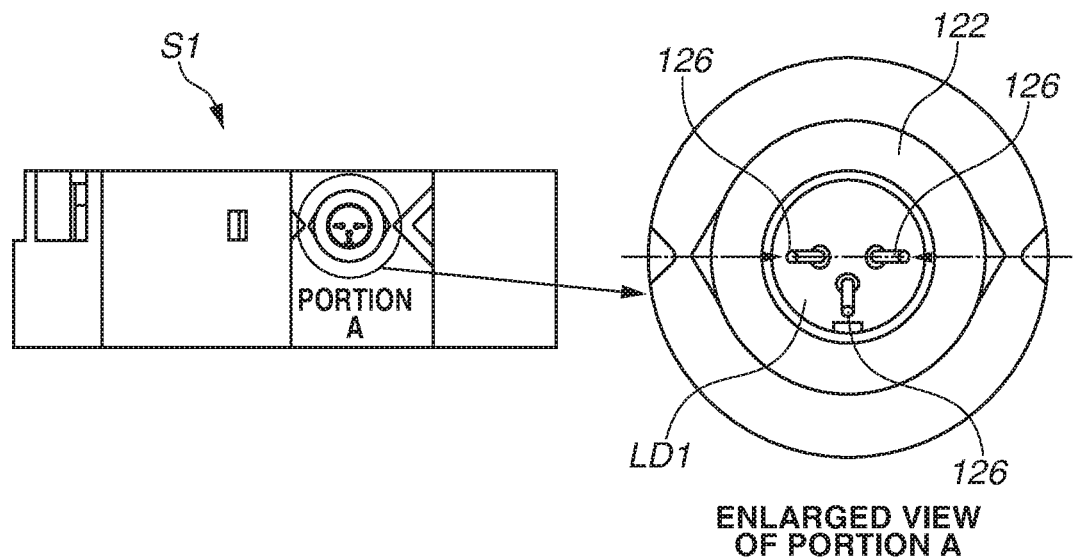
FIGS. 5A and 5B are respectively front views of a laser driving unit including a single-beam light source in a conventional form.
Figure 5B:
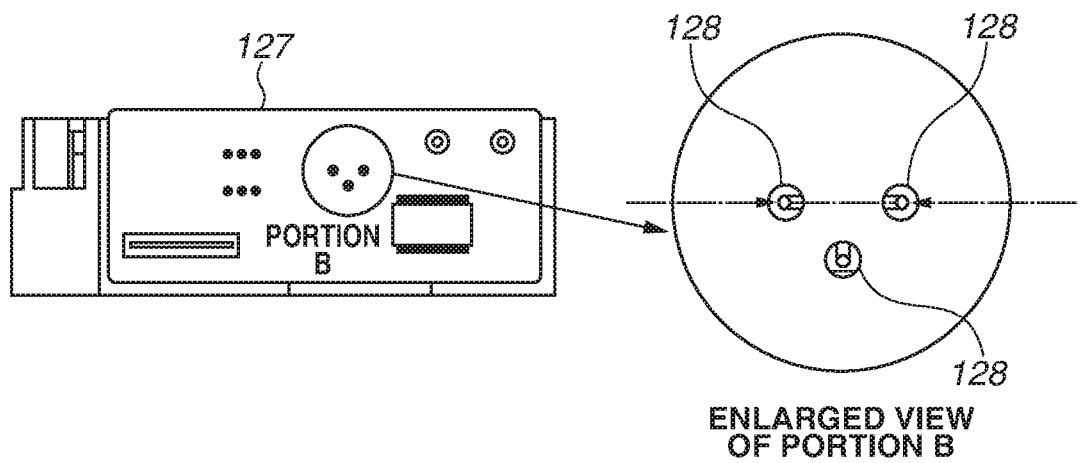

A conventional optical scanning apparatus S1 using a single-beam light source will be described below. FIGS. 5A and 5B illustrate the optical scanning apparatus S1 using the single-beam light source in a conventional form, as viewed from the side of a laser driving circuit substrate 127. FIG. 5A illustrates an optical box on which the laser driving circuit substrate 127 has not yet been mounted. FIG. 5B illustrates the optical box on which the laser driving circuit substrate 127 has been mounted. The vicinity of a light source LD1 enclosed by a circle on the left side of FIG. 5A is a portion A, and an enlarged view of the portion A is illustrated on the right side thereof. Similarly, the vicinity of the light source LD1 enclosed by a circle on the left side of FIG. 5B is a portion B, and an enlarged view of the portion B is illustrated on the right side thereof. As illustrated in FIG. 5A, the number of lead pins (terminals) 126 in the light source LD1 that is as a single-beam light source is three. As described above, an angle adjustment is not required in the single-beam light source. Thus, the light source LD1 is pressed into a laser holder 122 with a phase easily regulated by a jib, in a state determined to some extent. The light source LD1 is usually pressed into the laser holder with a phase substantially matching a plane corresponding to a main scanning direction or a phase rotated by 180° around an optical axis, as illustrated in FIG. 5A, in consideration of shortening of a take time and simplification of the jig. After the laser holder has been fixed to the optical box 118, the laser driving circuit substrate 127 is mounted on the optical box 118 so that the three lead pins 126 respectively penetrate three holes 128 provided in the laser driving circuit substrate 127, as illustrated in FIG. 5B. Each of the holes 128 and the corresponding lead pin 126 are soldered to each other. A laser driving circuit provided in the laser driving circuit substrate 127 and the light source D1 are electrically connected to each other.

While the laser driving circuit substrates 127 and 130 differ in only the number of the holes into which the lead pins are to be respectively inserted and an arrangement of the holes, the laser driving circuit substrates 127 and 130 are respectively produced and differently used. In the present exemplary embodiment, a method for further reducing costs by sharing components will be described.

[Optical Scanning Apparatus S3 According to Present Exemplary Embodiment]

A single-beam optical scanning apparatus S3 according to the present exemplary embodiment uses a laser driving circuit substrate 132 composed of a base plate in the same shape as that of the laser driving circuit substrate 130. More specifically, the number of holes in the laser driving circuit substrate 132 and a layout of the holes are respectively the same as the number of holes in the laser driving circuit substrate 130 and the layout of the holes. The optical scanning apparatus S3 will be described below. The optical scanning apparatus S3 differs from the optical scanning apparatus S1 in only a rotation phase of a light source with respect to an optical box, and a configuration of a laser driving circuit substrate. The optical scanning apparatus S3 uses a light source LD1, which is a single-beam light source, as a light source, and the laser driving circuit substrate 132 for driving the light source LD1.

Figure 7A:
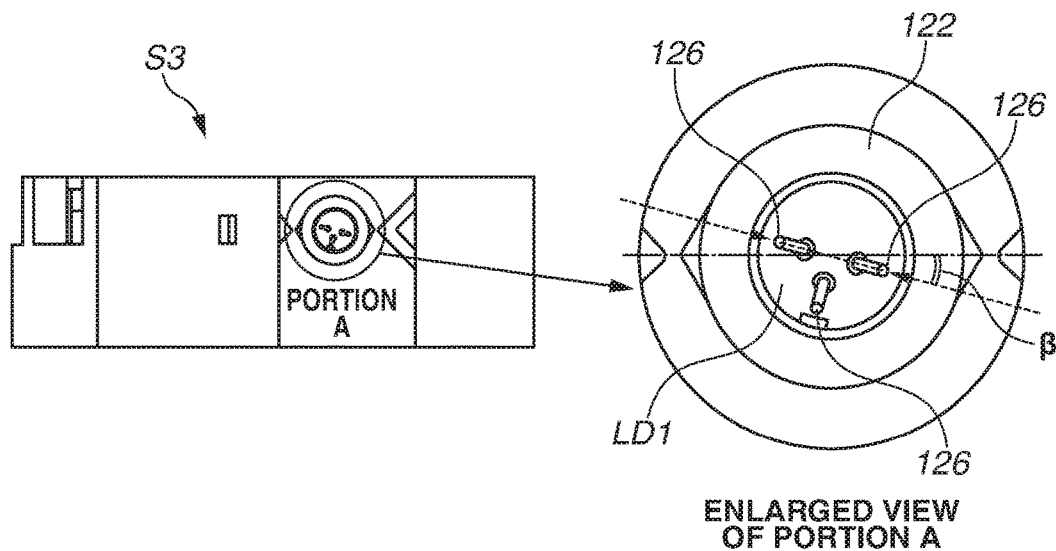
FIGS. 7A and 7B are respectively front views of a laser driving unit including a single-beam light source.
Figure 7B:
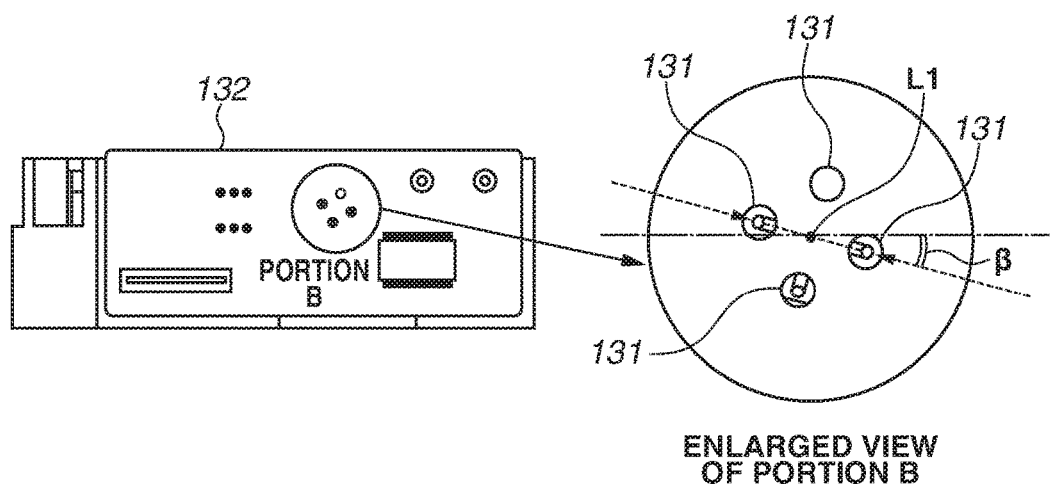

FIGS. 7A and 7B illustrate the optical scanning apparatus S3 as viewed from the side of the laser driving circuit substrate 132. FIG. 7A illustrates an optical box on which the laser driving circuit substrate 132 has not yet been mounted. FIG. 7B illustrates the optical box on which the laser driving circuit substrate 132 has been mounted. The vicinity of the light source LD1 enclosed by a circle on the left side of FIG. 7A is a portion A, and an enlarged view of the portion A is illustrated on the right side thereof. Similarly, the vicinity of the light source LD1 enclosed by a circle on the left side of FIG. 7B is a portion B, and an enlarged view of the portion B is illustrated on the right side thereof. As illustrated in FIG. 7A, the light source LD1 that is a single-beam light source is also pressed into a laser holder with the laser holder rotated by about an angle of β around an optical axis L1 so that lead pins 126 are arranged therein in a similar manner as those in the light source LD2 that is a two-beam light source. Thus, a chip surface (first chip surface) of a laser diode chip of the light source LD1 is also inclined at an angle of β with respect to a direction corresponding to a main scanning direction. Holes 131 are arranged at equal spaces on a concentric circle centered at the optical axis L1 of the light source LD1. As for the holes 131 in the laser driving circuit substrate 132, a line connecting the holes 131, which oppose each other with the optical axis L1 therebetween, is inclined at an angle of β with respect to the direction corresponding to the main scanning direction, similar to the holes 131 in the laser driving circuit substrate 130.

Accordingly, although the laser driving circuit substrate 132 differs from the laser driving circuit substrate 130 in a circuit pattern and mounted electronic components, regarding an outer shape of a base plate (a main body portion) of the laser driving circuit substrate, and the number of the holes 131 and an arrangement of the holes 131, the laser driving circuit substrate 132 can use the same components as those used in the laser driving circuit substrate 130 for the light source LD2. Therefore, when the laser driving circuit substrate 132 is mounted on the optical box, the four holes 131 are respectively arranged at positions opposing the light source LD1. The lead pins 126 are respectively inserted into and connected to three of the four holes 131, and the lead pin 126 is not inserted into the remaining one of the four holes 131.

In the present exemplary embodiment, the optical scanning apparatus (first optical scanning apparatus) S3 and the optical scanning apparatus (second optical scanning apparatus) S2 constitute an optical scanning apparatus system. An arrangement (a phase around the optical axis LD1) of the lead pins (first terminals) 126 in the optical scanning apparatus S3 using the single-beam light source (first light source) LD1 is matched with an arrangement of the lead pins (second terminals) 129 in the optical scanning apparatus S2 using the two-beam light source (second light source) LD2. The number of the holes (first holes) 131 in the laser driving circuit substrate (first substrate) 132 is made equal to the number of the holes (second holes) 131 in the laser driving circuit substrate (second substrate) 130. Therefore, the number of the holes 131 is larger than the number of the lead pins 126 in the light source LD1. Accordingly, the base plate of the laser driving circuit substrate can be shared by light sources respectively including different numbers of light emitting points. When the laser driving circuit substrate is shared, a process for pressing the light source into the laser holder and a process for mounting and soldering the laser driving circuit substrate can be substantially shared. This leads to simplification of a production line by sharing an assembling process and as a result, enables costs and a take time for assembly to be suppressed.

While description has been made using examples of a single-beam light source and a two-beam light source in the present exemplary embodiment, a combination of the single-beam light source and another multibeam light source such as a four-beam light source may be used. The present invention is not limited to a combination of the single-beam light source and the two-beam light source. While a configuration in which a light source is fixed to an optical box via a laser holder has been described, the light source may be directly pressed into the optical box and fixed thereto.

As described above, according to the present exemplary embodiment of the invention, a common substrate can be used for light sources respectively including different numbers of light emitting points, so that costs for producing an optical scanning apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-028947, filed Feb. 17, 2015, which is hereby incorporated by reference herein in its entirety.

What is claimed is:

1. An optical scanning apparatus comprising:
   a light source;
   a substrate including an electric circuit for causing the light source to emit light; and
   a deflection unit configured to deflect and scan the light emitted from the light source,
   wherein the light source and the electric circuit are connected to each other with terminals of the light source inserted into holes provided at positions, opposing the light source, of the substrate,
   wherein the substrate includes a plurality of holes, and a number of the plurality of holes is larger than a number of the terminals of the light source, and
   wherein the substrate has an area with which the light source is overlapped as seen in an optical axis of the light, and
   the plurality of holes is located in the area of the substrate and the plurality of holes is located within a concentric circle centered at the optical axis of the light emitted from the light source toward the deflection unit.

2. The optical scanning apparatus according to claim 1, wherein the terminals of the light source are soldered.

3. The optical scanning apparatus according to claim 1, wherein the plurality of holes is arranged at equal spaces on the concentric circle.

4. The optical scanning apparatus according to claim 1, further comprising a deflection unit configured to deflect and scan the light emitted from the light source, wherein the light source includes a chip having one light emitting point on one end surface of the chip, and another surface of the chip different from the one end surface of the chip is inclined with respect to a direction corresponding to a main scanning direction in the light source.

5. The optical scanning apparatus according to claim 1, wherein the number of the terminals of the light source is three, and the number of the plurality of holes included in the substrate is four.

6. An optical scanning apparatus system comprising:
a first optical scanning apparatus that includes a first light source, and a first substrate including a first electric circuit for causing the first light source to emit light, the first light source and the first electric circuit being connected to each other with first terminals of the first light source inserted into a plurality of first holes provided at positions, opposing the first light source, of the first substrate; and
a second optical scanning apparatus that includes a second light source, and a second substrate including a second electric circuit for causing the second light source to emit light, the second light source and the second electric circuit being connected to each other with second terminals of the second light source inserted into a plurality of second holes provided at positions, opposing the second light source, of the second substrate,
wherein a number of the plurality of first holes provided in the first substrate and a number of the plurality of second holes provided in the second substrate are the same, a number of the first terminals of the first light source is smaller than the number of the plurality of first holes, and a number of the second terminals of the second light source and the number of the plurality of second holes are the same.

7. The optical scanning apparatus system according to claim 6,
wherein the first optical scanning apparatus further includes a first deflection unit configured to deflect and scan the light emitted from the first light source, and the second optical scanning apparatus further includes a second deflection unit configured to deflect and scan the light emitted from the second light source, and
wherein the plurality of first holes is arranged on a concentric hole centered at an optical axis of the light emitted from the first light source toward the first deflection unit, and the plurality of second holes is arranged on a concentric circle centered at an optical axis of the light emitted from the second light source toward the second deflection unit.

8. The optical scanning apparatus system according to claim 7, wherein the plurality of first holes is arranged at equal spaces and the plurality of second holes is arranged at equal spaces, respectively, on the concentric circles.

9. The optical scanning apparatus system according to claim 6,
wherein the first optical scanning apparatus further includes a first deflection unit configured to deflect and scan the light emitted from the first light source, and the second optical scanning apparatus further includes a second deflection unit configured to deflect and scan the light emitted from the second light source,
wherein the first light source includes a first chip having one light emitting point on one end surface of the first chip, and another surface of the first chip different from the one end surface of the first chip is inclined with respect to a direction corresponding to a main scanning direction in the first light source, and
wherein the second light source includes a second chip having two light emitting points on one end surface of the second chip, and another surface of the second chip different from the one end surface of the second chip is inclined with respect to a direction corresponding to a main scanning direction in the second light source.

10. The optical scanning apparatus system according to claim 6,
wherein the number of the first terminals of the first light source is three, and the number of the plurality of first holes included in the first substrate is four, and
wherein the number of the second terminals of the second light source is four, and the number of the plurality of second holes included in the second substrate is four.

* * * * *